United States Patent [19]

Weiss

[11] Patent Number: 5,609,952
[45] Date of Patent: Mar. 11, 1997

[54] SENSORED COMPOSITE STRUCTURE

[75] Inventor: Richard J. Weiss, Sepulveda, Calif.

[73] Assignees: Arthur Michael Solender; Stephen Lawrence Solender; Elsie Solender, all of Los Angeles, Calif.; part interest to each

[21] Appl. No.: 470,343

[22] Filed: Jan. 25, 1990

[51] Int. Cl.$^6$ .............. D04H 13/00; G02B 6/04
[52] U.S. Cl. .................. 428/298.1; 428/298.7; 428/312.6; 385/115; 385/141
[58] Field of Search .............. 428/295, 303, 428/312.2, 312.6; 350/96.24, 96.32; 385/17, 115, 141

[56] References Cited

U.S. PATENT DOCUMENTS

| | | | |
|---|---|---|---|
| 3,449,037 | 6/1969 | Koester | 350/96.25 |
| 3,456,211 | 7/1969 | Koester | 350/96.29 |
| 3,526,880 | 9/1970 | Filippazzi | 340/173 |
| 3,670,260 | 6/1972 | Koester et al. | 350/167 |
| 4,170,398 | 10/1979 | Koester | 350/6.8 |
| 4,758,064 | 7/1988 | Neefe | 350/96.23 |
| 4,807,963 | 2/1989 | Iwasaki | 350/96.24 |
| 4,927,230 | 5/1990 | Tokumitsu | 350/96.24 |
| 4,995,699 | 2/1991 | Lo | 350/96.32 |

Primary Examiner—Peter A. Nelson
Attorney, Agent, or Firm—Evanns & Walsh

[57] ABSTRACT

A sensored composite structure comprises a coherent bundle of fibers having structural strength and optical transmissivity properties embedded in a matrix, whereby stresses and other parameters of the structure may be measured by reference to the image resulting from light transmitted through said coherent fiber bundle. Other properties of the fibers, such as magnetic and thermochromic, may be utilized to measure other parameters such as temperature and magnetic flux.

15 Claims, 2 Drawing Sheets

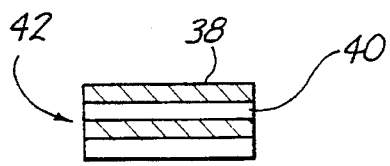
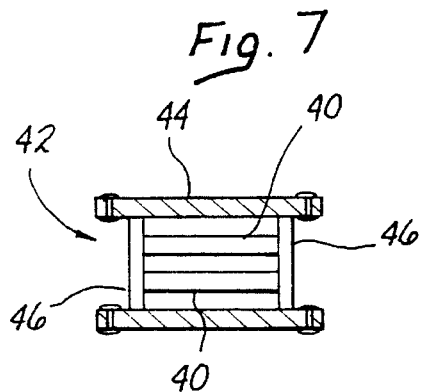
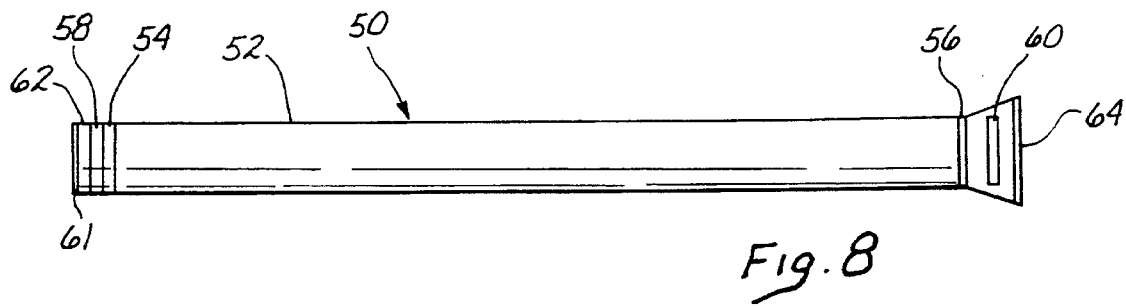
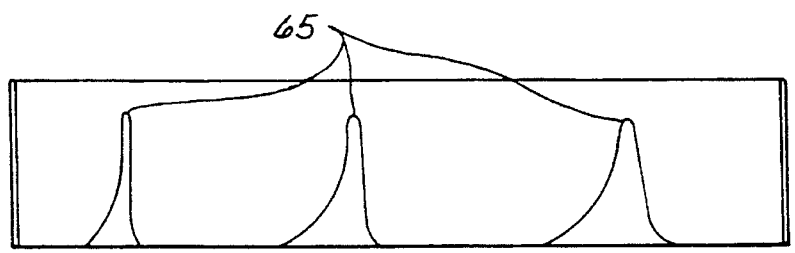
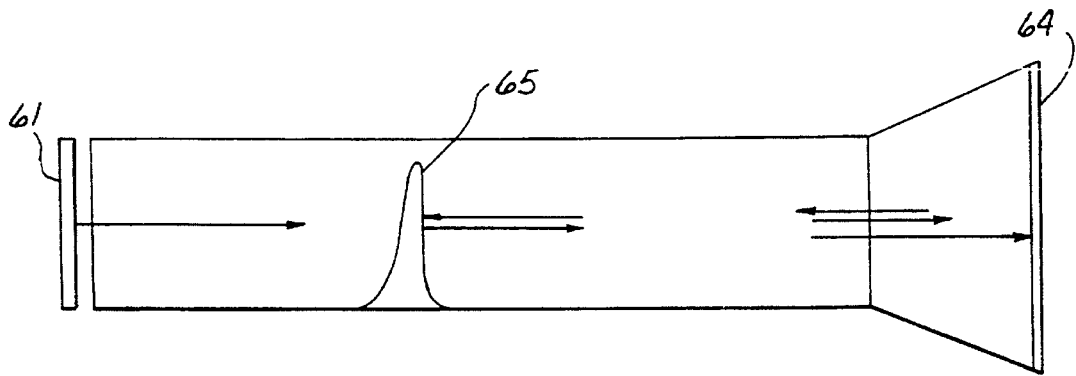

SENSORED COMPOSITE STRUCTURE

BACKGROUND OF THE INVENTION

1. Field of the Invention

The invention relates to composite structures including fibers within a matrix.

2. Description of the Prior Art

Composite structures having structural-strength fibers embedded within suitable matrices have developed extensively within the past two decades. Specific examples of such composites include structures consisting of graphite fibers within a polymeric or metal matrix. Graphite structures have been successfully used in applications requiring high modulus, high strength, flexibility, and light weight.

Recently, the rapidly developing technology of optical fibers has been combined to some degree with the earlier technology of structural strength composites. In a typical case a small number of optical fibers are introduced into existing composite structures for the purpose of affording the opportunity of examining optical signals transmitted by them, thereby to obtain data concerning the condition of the composite structure, specifically stresses and strains therein as well as breakage or deformation of the optical fibers themselves. Such composites including optical fibers are commonly known as "smart skins" and are often employed in connection with structural components of thin configuration, such as are found on the wings of aircraft.

Existing smart skin structures have, however, a number of disadvantages and drawbacks. Among these are the fact that in such existing structures a relatively limited number of optical fibers have been embedded in the matrix, with correspondingly sparse results in terms of data concerning the condition of the composite. In addition, the optical fibers may yield erroneous values for the condition of the composite since they do not bond to the matrix to the same degree or in the same manner as the strengthening fibers. Under such circumstances, the optical fibers may record only the stresses around themselves, which may be significantly different from those in the composite as a whole.

A further drawback of existing structures includes the possibility that the optical fibers may debond from the matrix thereby causing erroneous data to be produced, since debonding relieves the optical fibers of flexural strain. Also, optical time domain reflectometry yields relatively inferior resolution with respect to isolating the precise areas of high strain in a distributed sensing mode, which examines stresses at a series of positions along the fiber. Additionally, complexities in data processing result from multiplexing of output signals from a plurality of embedded optical fibers, reasonable resolution, for example, in a composite of 1 m by 10 cm 1 cm requiring approximately 1000 fibers; thus, connection of smart skins of this type to data processing systems requires extra data processing power.

Therefore, there has been a felt but unfullfilled need for a sensored composite structure including optical fibers providing the capability of monitoring strain or other parameters in the bulk composite structure while at the same time avoiding undue complexity in signal monitoring and still providing structural strength.

SUMMARY OF THE INVENTION

The invention herein provides a sensored composite structure comprising at least one sensor fiber having the structural strength and of optical transmissivity embedded in a matrix and bonded thereto such that particular characteristics of the structure may be measured through the optical qualities of the fiber. Light pulse emitting means are associated with the sensored composite structure to emit light pulses in a controlled fashion through transmitting means, through the optical fibers, and finally to optical receiving means. Display members establish visual display patterns which are used to detect distortion, deformation of and other sensing functions the optical fibers, thereby providing data concerning strains and other parameters relative to the structure.

In addition, the fibers may be embedded in a matrix of substantially sheet-like laminar configuration suitable for affixation to a structural-strength laminate as, for example, one fabricated of metal, providing a composite structure comprised of such laminates arranged in alternating fashion.

A fuller understanding of the invention may be had by referring to the following description and claims, taken in conjunction with the accompanying drawings.

BRIEF DESCRIPTION OF THE DRAWINGS

FIG. 6 is a somewhat schematic depiction of a sectional view of a multi-layer laminate including a sensored composite structure in accordance with the invention;

FIG. 7 is a sectional view, somewhat schematic, of an arrangement of laminates including a sensored structure in accordance with the invention;

FIG. 8 is a side elevation of a sensored structure in accordance with the invention including means for accomplishing a distributed strain examination along the length thereof;

FIG. 9 depicts a wave profile of pressure pulses in the arrangement depicted in FIG. 9; and FIG. 10 depicts in schematic form signal paths produced in the distributed sensor mode of the invention.

DETAILED DESCRIPTION OF PREFERRED EMBODIMENT

Figure 1:
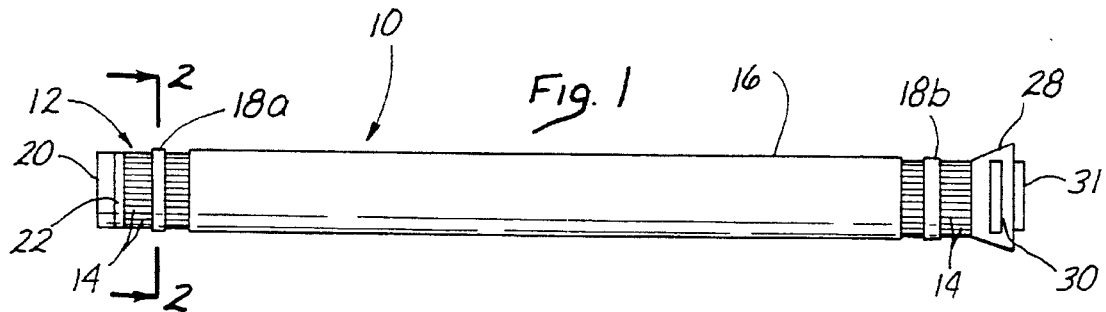
FIG. 1 is a side elevation, somewhat simplified, of a sensored composite structure in accordance with the invention.
Figure 2:
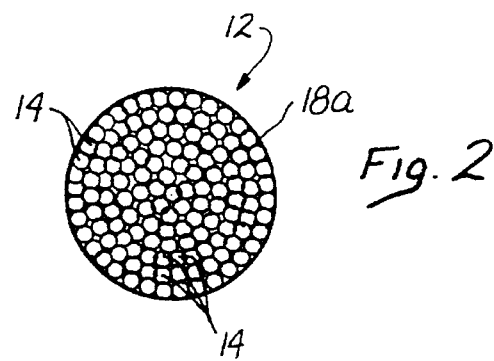
FIG. 2 is a sectional view of the sensored composite structure depicted in FIG. 1 taken along the line 2—2.

As best seen in FIGS. 1,2, a sensored composite structure 10 in accordance with the invention includes a coherent bundle 12 of fibers 14. The coherent bundle 14 comprises a group of fibers capable of transmitting an undistorted image when unstressed. Fibers 14 are disposed adjacent one another and are embedded in a matrix 16 to form sensored composite structure 10. Fibers 14 are held in alignment by a pair of clamps 18a, 18b disposed at either end of the bundle 12 of fibers 14, the ends of the bundle 12 protruding from the matrix 16.

Fibers 14 have structural-stengthening properties as well as the property of optical transmissivity. Such fibers capable of transmitting electromagnetic signals are, for example, specially coated silica (SiO$_2$) and single crystal sapphire (Al$_2$O$_3$) both of which are capable of achieving tensile strengths approaching one million psi. The matrix 16 may be typically composed of epoxy (employed with silica fibers) and aluminum (for single crystal sapphire fibers).

The matrix 16 is wettable, that is, it is bondable to the fibers 14 or to a coating specially disposed thereon, and is capable of transformation from the liquid phase to the solid without damaging or exerting excessive stress upon fibers 14. As noted, the particular cited combinations of fibers and matrices are exemplary only, and other combinations may be used in accordance with the invention.

The bundle 12 of fibers 14 is embedded in matrix 16 which has hardened around it. Because fibers 14 are substantially more rigid in tension than the matrix 16, as for example silica fibers in epoxy, the structure 10 becomes a structural component, with the fibers 14 supporting external loading. Components such as these can be employed, particularly when combined with structural strength laminar material, for such larger structures as aircraft frames.

The coherent bundle 12 of fibers 14 cast into matrix 16, comprises a sensored composite structure. The ends of the fibers 14 are depicted as held in alignment by clamps 18a, 18b; however, without departing from the invention other means for holding the fibers in place in an initial position may be employed as, for example, an epoxy disposed at the ends of the bundle 12.

Figure 3:
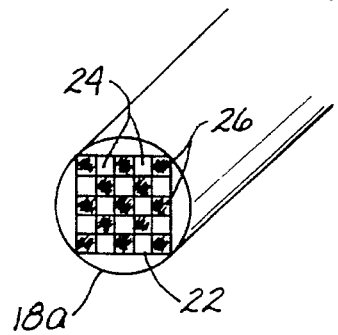
FIG. 3 is a detail view, somewhat simplified, of a light display pattern used with the invention.

Disposed at one end of the structure 10 (shown as being to the left in FIG. 1) is a light pulse source 20, which may be in the form of a light emitting diode (LED) or a small laser. As best seen in FIG. 3, disposed adjacent to the light emitting diode 20 is optical filter means in the form of optical filter member 22 displaying an alternating "checker board" pattern of square light transmissive regions 24 and opaque regions in the form of squares 26. At the opposite or receiving end of the optical bundle 12 is a receiving means 28. Receiving means 28 includes a light receiver member 30 with the same form and characteristics as mask member 22. The source 20 is connected to a power source (not shown).

In the non-distributed sensor composite (NDSC) mode, the light emitting source 20 is activated to emit pulses of light. The frequency of such pulses and their intensity are related to the particular materials involved and specific application of the invention and may be selected and controlled by conventional means known to those skilled in the art.

The emitted light pulse is transmitted through mask member 22 and the light and dark regions 24,26 therein. Thereafter, the light pulse is transmitted along the fibers 14, at receiving member 28 passes through mask member 30, and is detected at detector means 31 (shown schematically) which may comprise, for example, a photo-electric cell or position-sensitive detector to provide two-dimensional data concerning the transmitted light.

In the unstrained condition of the sensored structure 10, an image transmitted through the fibers 14 will appear undistorted and unchanged as between the image at transmission and the image at reception. Thus, when the checkerboard mask members 22, 30 are out of phase with one another by 90°, an undistorted and unstrained composite structure will be clearly indicated by the lack of transmission of light through blockage of the light pulse by mask member 30. Any stress reflecting itself in a strain and deformation of the composite structure 10, producing rotation or bending of the structure 10 will result in some transmission of the light pulse through mask member 30. Positioning of mask members 22, 30 with respect to one another can be accomplished through causing one or both to be rotatable and/or translatable relative to one another.

Figure 4:
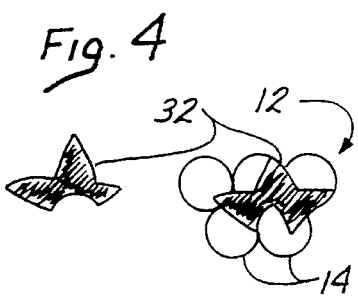
FIG. 4 is a detail view of light reception from a transmission through optical fibers of a strained structure in accordance with the invention.

Depicted in FIGS. 4, are typical light display patterns indicating flexural or rotational strain in the structure 10. Such strain produces in a transmitted image 32 the depicted wedge and line pattern of light intensity resulting from the cumulation of the effects of rotational and flexural components of strain in the structure 10, wedges of light corresponding to rotation and straight lines corresponding to bending. Breakage of a fiber 14 causes the appearance of a permanent dark region. The light pattern display at the receiving member 28 provides an average measure over the length of the structure 10 of the strain therein through analysis of the distortions of the checkerboard pattern employing detector 31. Optimum resolution is achieved by minimizing the size of the squares on the checkerboard mask members 22, 30.

Figure 5A:
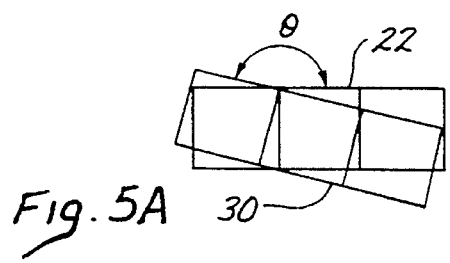
FIGS. 5a, 5b, 5c depict in somewhat schematic form details of light transmission through a sensored structure in accordance with the invention, indicating stress.
Figure 5C:
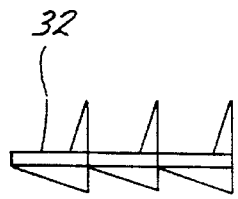
Figure 5B:
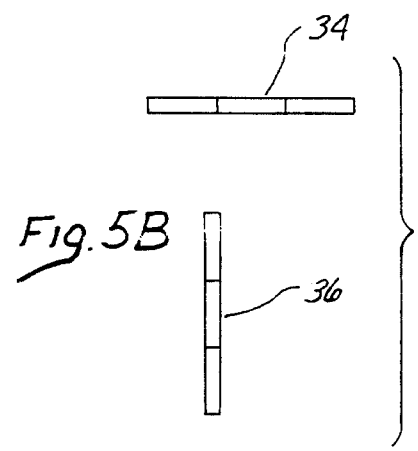

FIGS. 5a,5b,5c depict in somewhat simplified form further details of the components of an overall image resulting from strains of various types in the structure 10. As depicted in FIG. 5a, the mask members are displaced through angle θ, due to strain. Depicted in FIG. 5c is the image 33 received through mask member 30. Depicted in FIG. 5b are components of the image 33 shown in FIG. 5c. The image 34 shown in FIG. 5b is the pattern in transmitted light due to a flex in the Y direction, i.e. vertically. Also depicted in FIG. 5b is image 36 of the component corresponding to an X-direction (horizontal) flex.

The combination of the various components indicating strain, provides an overall display which in turn can be analyzed into separate components to determine the degrees and kinds of strains in the sensored structure 10.

Certain typical factors which can affect the transmitted image are: broken fibers 14, yielding blank spots; local bends in any fiber 14, causing reduction of light intensity transmitted via that fiber, thereby affecting quality of the transmitted image; a fiber bent beyond the critical angle for total internal reflection from the cladding thereof causing most of the light to escape from the fiber, thus producing the appearance of a severed fiber; local temperature increases causing local expansion of fibers 14, thus altering the local index of refraction and thereby scattering the light to some degree and reducing the intensity of the transmission as well as producing in some eventualities also a scatter of light to a neighboring fiber with some blurring of the image.

Additional factors affecting the quality of the transmitted image include substantial fluxes of gamma radiation which may damage the fibers, thereby reducing image brightness as well as potentially producing color changes which may alter the color of the transmitted image. A further factor affecting the quality of the transmitted image is local strain caused by pressure gradients, rotating the polarization of the transmitted light, which light when viewed through polarizers placed in the positions of masks 22,30 will have its intensity affected thereby.

By doping fibers 14 with a thermochromic liquid crystal appropriate to a range of temperatures being measured, temperature sensing can be achieved in accordance with the invention. This is a consequence of the change in color which thermochromic materials undergo with temperature, the readout through optical color filters providing a cross-sectional, two-dimensional, temperature distribution averaged over the length of the structure 10.

A further factor affecting quality of the transmitted image is the presence of magnetic flux lines with respect to fibers having a magnetic coating, which fibers will be strained, thereby causing a reduced intensity resulting from scattering. Chemical interactions of fibers 14 with liquids will cause a diminution of signal strength due to scattering. This is particularly pronounced with respect to silica fibers having a polymeric coating, due to the hydophilic character of many polymers.

As best seen in FIGS. 6,7, a sensored structure 10 in accordance with the invention, in the form of a substantially planer laminate 38 may be structurally associated with a laminate 40 of material, such as aluminum alloy, steel, or another composite with greater structural strength or higher modulus properties. As depicted in FIGS. 6, 7, the laminate structure 42 comprising laminates 38, 40 is configured to contain alternating layers of laminates 38, 40. In this manner, the structure 42 includes substantial structural strength property, optical properties, and other desirable properties described hereinbelow.

As depicted in FIG. 6, the respective layers of laminate 38, 40 may be joined by such bonding as a cynoacrylate resin. The multi-layer laminate structures depicted in FIGS. 6,7, provide a number of advantages among which are the following. The metal layers 40 provide heat sinks which, among other things, inhibit flammability of the polymeric matrix. The presence of metal permits joining as, for example, by brazing, bolting, or welding. Additionally, the metal layers 40 dissipate static charge, improve surface erosion resistance, and protect the matrices of sensored structures.

As depicted in FIG. 7, a frame 42 includes horizontal members 44 and vertical members 46, in which sensored structures 40 may be installed. In this application, the metal selected is consistent with the modulus of the silica fibers, assuring satisfactory bonding through shrink-fitting of the sensored structures 40 into the metal frame 42.

Depicted in FIGS. 8–10, inclusive, is an arrangement in accordance with the invention whereby a sensored structure 50 in accordance with the invention functions as a distributed sensing composite (DSC). Sensored structure 50 includes a matrix 52 in which are embedded optical fibers (not shown). Sensored structure 50 includes clamps 54,56 at the transmission and reception ends respectively, of the structure 50. At the transmission end of structure 50 is disposed mask member 58, and a corresponding mask member 60 is disposed at the receiving end of structure 50. Positioned at the transmission end of the structure 50 is a light emitting source means 61 in the form of a pulsed light emitting diode, as described in connection with FIGS. 1–3, inclusive. Disposed between the light source 61 and mask filter 58 is a pressure-pulse source 62 which may be in the form of an optically transparent piezo-electric crystal such as quartz. Means for controlling and actuating light source 61 and pressure source 62 are not shown and are of conventional type. Positioned at the receiving end of structure 50 is reflective means in the form of a half-silvered mirror member 64. Member 64 is partially coated with reflective material, such as silver, in such a manner as to reflect a portion of incident light and to transmit a portion thereof as well. Light passing through the member 64 is received and examined by a detector (not shown).

Prior to operation in both the NDSC and DSC modes, calibration is performed. This is achieved through removal of the mask filter 58 for the purpose of making certain that in an unstressed state of the structure 50 each separate pixel, i.e. region of transmissivity or opacity, at the receiving end of the structure records either zero or full intensity for a particular pulse of light, depending on whether the particular pixel corresponds to a transparent or opaque region of the checkerboard mask filter 58. The checkerboard mask filter 60 is then aligned for totally blocking light transmitted through the transparent regions of mask filter 58. Hereafter, the structure is calibrated for a defined strain with apparatus such as a screw and micrometer (not shown).

Following the aforesaid operations, the pressure pulse source 62 is actuated. Concurrently, the light source 61 is activated to emit a light pulse. The shock front moves through the structure 50 with, as is typical of a shock front moving through a solid, a range of frequencies from the highest elastic wave frequency not subject to significant dispersion to the lowest frequency with significant amplitude. The shock front moves through the solid with residual dispersion due to rapid attenuation of highest frequencies. Any spreading of the shock front with time only has the effect of limiting spatial resolution, but not to any degree which could substantially affect the function of the invention. FIG. 9 depicts pressure pulse signals 65 expected in operation of the sensored structure 50 during the distributed sensing mode. The light pulse produced by source 61 passes through the bundle of fibers and is partially reflected from the mirror 64, the reflected portion then returning through the fibers and encountering the oncoming shock front proceeding in the opposite direction. The velocity of the shock wave being known, its position between the mask members 58,60 can be determined at any given time following its launching. The shock front thus provides in effect a time fiducial mark, increasing as it does the local density of the fibers and thereby the local index of refraction, and vice versa in tension.

In the foregoing manner, there is produced a moving, optically reflecting boundary such that two optical wave fronts arrive at the detector beyond member 64, one being transmitted through the member 64, the other being reflected from member 64 and Doppler shifted from the shock front, thereafter passing again through the member 64 to the detector.

The light pulses being generated at various times, encounter the shock front at various positions along the fiber bundle. Through comparison of the checkerboard pattern for each light pulse with a pattern prior to initiation of the shock wave, identification can be accomplished of specific portions of the signal which have been reflected from the shock front, enabling identification of the contribution for each distributed element of length along the structure 50.

The invention when employed in the DSC mode affords the capability upon installation, as for example, in aircraft or space vehicles, for recording strains occurring due to passenger loading, fuel loading, take-off, inflight, landing and residual strains after unloading, further providing a cumulative record of each component's change in residual strain, a guide to replacement of sections of sensored structure, as well as a warning device regarding component overload. In addition, sectors of excess strain can be located.

The foregoing description and drawings are illustrative and descriptive of the invention, which is defined and limited only by the following claims, interpreted in light of the specification.

What is claimed is:

1. A sensored composite structure comprising:

at least one fiber, said fiber having the property of structural strengthening and the property of optical transmissivity; and a matrix, said at least one fiber being embedded in said matrix and bonded thereto, such that at least one characteristic of said structure can be measured by means of variation in the optical transmissivity of said optical fiber.

2. The invention as set forth in claim 1 further including a plurality of said fibers disposed adjacent one another within said matrix and bonded thereto.

3. The invention as set forth in claim 2 wherein said plurality of fibers are coherent and disposed in an unstressed condition substantially parallel to one another.

4. The invention as set forth in claim 1 further including means engaged with said matrix and in contact with said fiber for receiving images transmitted by said fiber.

5. The invention as set forth in claim 2 further including means for holding the ends of said plurality of fibers in position, said ends protruding from said matrix.

6. The invention as set forth in claim 2 wherein said matrix and said plurality of fibers are substantially in the form of a laminate and further including a second laminate having structural-strength property joined thereto.

7. A sensored composite structure comprising:
a plurality of fibers disposed adjacent one another, said fibers having the property of structural strengthening and the property of optical transmissivity; and
a matrix, said plurality of fibers being embedded in said matrix and bonded thereto, such that at least one characteristic of said structure can be measured by means of the optical transmissivity of said optical fibers, said matrix and said plurality of fibers being substantially in the form of a plurality of laminates, and further including a plurality of laminates having structural strength property joined to said first-mentioned laminates, said first-mentioned laminates and said laminates having structural strength property being joined together in an alternating manner.

8. A sensored composite structure comprising:
a plurality of fibers disposed adjacent one another, said fibers having the property of structural strengthening and the property of optical transmissivity; and
a matrix, said plurality of fibers being embedded in said matrix and bonded thereto, such that at least one characteristic of said structure can be measured by means of the optical transmissivity of said optical fibers, said matrix and said plurality of fibers being substantially in the form of a laminate and further including a laminate having structural strength property joined thereto, said first-mentioned laminate and said laminate having structural strength property being joined to one another, said structural strength laminate being composed of metal.

9. The invention as set forth in claim 6 wherein said structural-strength laminate having structural property is fabricated of wettable polymer.

10. The invention as set forth in claim 2, further including light pulse emitting means, transmitter display means and receiver display means, said light pulse emitting means being capable of emitting light to said transmitter display means, the latter means being adapted to transmit an image through said fibers, and said receiver display means being capable of receiving said image, said transmitter display means comprising substantially a pattern of alternating light transmissive regions and opaque regions and said receiver display means comprising substantially a pattern of alternating light transmissive regions and opaque regions.

11. The invention as set forth in claim 10 further including means for producing pulsed shock waves to impinge upon said matrix and embedded fibers and further including partially light reflective means for receiving light transmitted through said plurality of fibers from said light pulse emitting means, said light pulse means and said pressure pulse means being responsive to timing means for generating said pressure pulses and said light pulses to impinge upon said matrix and fibers such that said light pulses are partially reflected and partially transmitted by said reflective means, whereby reflected light pulses encounter a pressure pulse proceeding in the same direction as the unreflected light pulse in selected regions of said fibers of said sensored structure for measuring the stress characteristics thereof.

12. The invention as set forth in claim 1, wherein the characteristic of said structure which is being measured is strain therein.

13. The invention as set forth in claim 9 wherein said wettable material comprises epoxy.

14. The invention as set forth in claim 3 wherein said fibers have thermochromic property and further including color filter means for receiving light transmitted through said fibers for providing readout of temperature distribution over the length of said fibers.

15. The invention as set forth in claim 3 wherein said fibers have magnetic property such that strain will be produced in said fibers by the presence of magnetic flex lines, thereby providing a measure of said magnetic flux lines through measuring strain in said fibers.

* * * * *